United States Patent [19]
Inoue et al.

[11] Patent Number: 4,764,695
[45] Date of Patent: Aug. 16, 1988

[54] VIBRATOR

[75] Inventors: Shinichi Inoue, Kobe; Yasushi Oshima, Akashi, both of Japan

[73] Assignee: Yamato Scale Company, Limited, Akashi, Japan

[21] Appl. No.: 15,732

[22] Filed: Feb. 17, 1987

[30] Foreign Application Priority Data

Apr. 25, 1986 [JP] Japan ................................. 61-97409

[51] Int. Cl.⁴ ............................................ H02K 35/00
[52] U.S. Cl. ...................................... 310/20; 310/80; 310/37; 318/114
[58] Field of Search ........................ 310/28, 29, 36, 37, 310/80, 81, 82, 15, 21, 22, 23, 24; 318/114, 115

[56] References Cited

U.S. PATENT DOCUMENTS

| Re. 22,549 | 9/1944 | Plensler | 310/820 |
|---|---|---|---|
| 2,437,904 | 3/1948 | Adams et al. | 310/204 |
| 2,494,760 | 1/1950 | Hush et al. | 310/37 |
| 2,662,192 | 12/1953 | Weyandt | 310/38 |
| 2,969,472 | 1/1961 | Faller | 310/82 |
| 3,117,244 | 1/1964 | Rosain et al. | 310/82 |
| 3,548,225 | 12/1970 | Vit | 310/80 X |
| 3,576,359 | 4/1971 | Cosh | 310/12 X |

FOREIGN PATENT DOCUMENTS

| 49-36289 | 10/1974 | Japan . |
|---|---|---|
| 58-18283 | 4/1983 | Japan . |
| 59-52426 | 4/1984 | Japan . |
| 445113 | 4/1936 | United Kingdom . |
| 624530 | 6/1949 | United Kingdom . |
| 869911 | 6/1961 | United Kingdom . |
| 917684 | 2/1963 | United Kingdom . |
| 1105334 | 3/1968 | United Kingdom . |

Primary Examiner—R. Skudy
Attorney, Agent, or Firm—Senniger, Powers, Leavitt and Roedel

[57] ABSTRACT

A vibrator for providing revolving vibration to a body to be vibrated such as a dispersion table of a vibration feeder or a sieve stack of a screening machine. In this vibrator, it is possible not only to control the amplitude of vibration but also to obtain a uniform vibration amplitude everywhere in the vibrating body inclusive of its center. A unique feature of this vibrator involves a plurality of armatures fixed to and around a vibrating member and actuated by associated electromagnets energized with multiphase a.c. power.

8 Claims, 2 Drawing Sheets

VIBRATOR

BACKGROUND OF INVENTION

This invention relates to a vibrator for generating mechanical vibration in devices such as a screening machine, a parts feeder for a working or assembling machine, or a product feeder for a weighing or packing machine. The inventive device is especially useful in a dispersion feeder for distributively feeding product to be weighed to respective weigh hoppers of a combination weigher.

One type of such vibrator is disclosed in Japanese utility model opening gazette No. 59-52426. In this device, the vibration is generated by a motor-driven cam wheel which is coupled to a member to be vibrated. The amplitude of vibration in this device cannot be controlled easily since it is determined by the profile of the cam wheel.

Another type is disclosed in Japanese patent publication No. 58-18283. In this device, a circular table to be vibrated is supported at its periphery by a plurality of leaf springs and a helical vibration is applied thereto by electromagnets energized by a.c. power. This device has a disadvantage in that the vibration amplitude is substantially zero at the center of the table and increases radially outwardly, though it can be easily controlled.

A further type of vibrator disclosed in Japanese utility model publication No. 49-36289 includes an eccentric weight rotationally driven by a motor which is fixed to a member to be vibrated. In this device, the member, together with the motor, is subjected to a revolving vibration (i.e., orbital movement) caused by centrifugal force generated by rotation of the eccentric weight. This device also has a problem in that it is difficult if not impossible to control the amplitude of vibration during operation. Since simple and accurate adjustment, even though theoretically possible, is difficult in actual practice for an average operator, the amplitude normally remains fixed.

SUMMARY OF INVENTION

Accordingly, an object of this invention is to provide an improved vibrator for generating a vibration having a uniform amplitude over the member to be vibrated, and which enables smooth and easy control of the vibration amplitude.

In accordance with this invention, there is provided a vibrator comprising a member to be vibrated which is elastically supported above a stationary base for orbital movement of the member about a generally vertical axis without substantial rotational movement of the member, and three or more armatures fixed to the member and disposed on a circle having its center on the vertical axis. Electromagnets facing respective armatures are fixed to the base and energized by multi-phase a.c. power thereby to cause said orbital movement of the member without substantial rotational movement.

These and other objects and features of this invention will be described in more detail below with reference to the accompanying drawings.

BRIEF DESCRIPTION OF DRAWINGS

In the drawing.

Throughout the drawings, the same reference numerals are given to like structural components and corresponding description is omitted.

DESCRIPTION OF PREFERRED EMBODIMENTS

Figure 1:
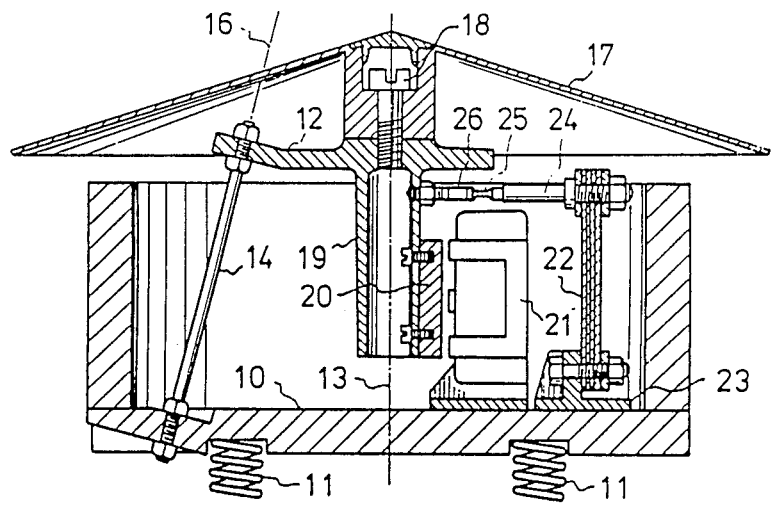
FIG. 1 is a sectional side view of a dispersion feeder in which this invention is embodied.
Figure 2:
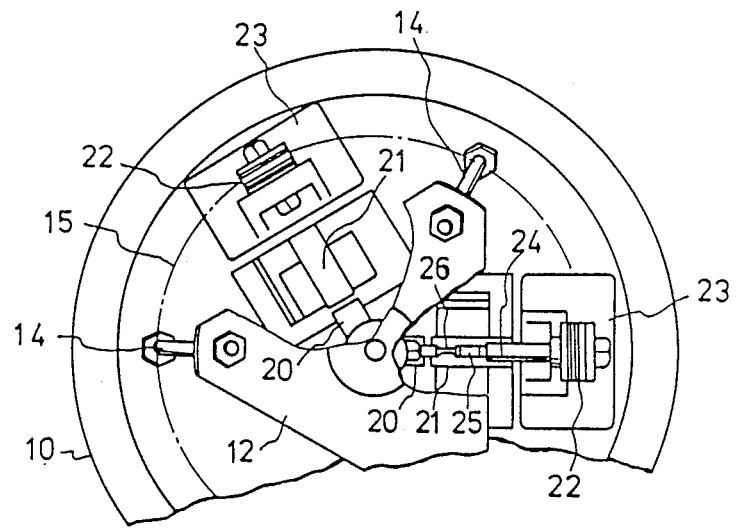
FIG. 2 is a partly broken-away plan view of the dispersion feeder of FIG. 1 from which the dispersion table is removed.

Referring to FIGS. 1 and 2, there is shown a dispersion feeder used, for example, in a combination weighing machine for distributing product fed to its central portion to a plurality of weighing units disposed around it. The feeder includes a cup-shaped base 10 supported on a machine frame (not shown) by vibration absorbing springs 11. A triangular vibrating member 12 having a vertical axis 13 common to the base 10 is supported by three slanting elastic support rods 14 disposed on a circle 15 having its center on the axis 13. The longitudinal axes 16 of these support rods 14 intersect at a point on the vertical axis 13. The vibrating member 12 supports a conical dispersion table 17 fixed thereto by a bolt 18.

A tubular leg 19 extends downwards from the bottom of the vibrating member 12 and three armatures 20 are fixed to and around its side wall at equal intervals. Three electromagnets 21 supported on the base 10 face respective armatures. Behind each electromagnet 21, there is a leaf spring 22 having its lower end fixed to the base 10 through a bracket 23 and its upper end fixed to the tubular leg 19 through a connecting rod 24. The connecting rod 24 has at least two thin flattened flexures 25 and 26 oriented in horizontal and vertical planes, respectively, for providing vertical and lateral flexibility of the rod.

Figure 3:
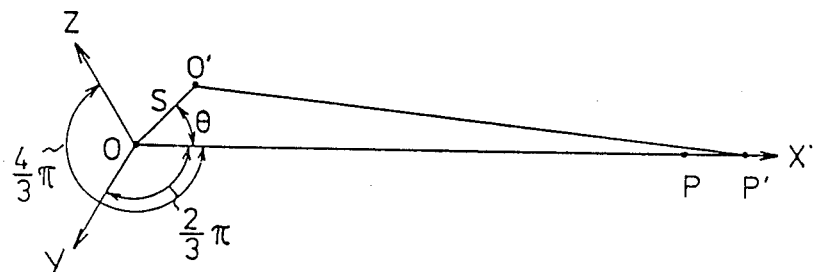
FIG. 3 is a diagram for explaining operation of the embodiment of FIGS. 1 and 2.

Referring next to FIG. 3, a symbol O denotes the position of vertical axis 13 and X, Y and Z denote the directions of three leaf springs 22 with respect to the axis 13. Assuming now that the center of vibration member 12 is displaced to a point O' by a distance S in a direction OO' angled by $\theta$ with respect to X-direction and this results in a displacement of one of the leaf springs 22 from P to P', then the magnitude of this displacement will be given as follows.

$$PP' = S \cdot \cos \theta$$

Therefore, the repulsive force F of the leaf spring is given as follows.

$$F = KS \cdot \cos \theta$$

where K is a spring constant of the leaf spring. Therefore, a component $F_\theta$ of the repulsive force in OO'-direction will be as follows.

$$F_\theta = KS \cdot \cos^2 \theta$$

Similarly, OO'-components of the repulsive forces of the remaining leaf springs in Y and Z-directions will be $KS \cdot \cos^2(\theta + \frac{2}{3}\pi)$ and $KS \cdot \cos^2(\theta + 4/3\pi)$, respectively. Accordingly, the sum of these OO'-components of the repulsive forces of three leaf springs is calculated as follows.

$$KS[\cos^2\theta + \cos^2(\theta + \tfrac{2}{3}\pi) + \cos^2(\theta + 4/3\pi) =]3/2KS$$

Thus, the sum becomes independent of angle $\theta$. This means that the vibrating member 12 can move in any direction and always be subjected to a spring constant equal to 1.5 times the spring constant K of each leaf spring 22. This is also the case with respect to the three elastic support rods 14. As described above, the spring constant is not directional and the resonance system defined by the total mass of the vibrating member inclusive of the dispersion table 17 does not exhibit any directional feature too.

Figure 4:
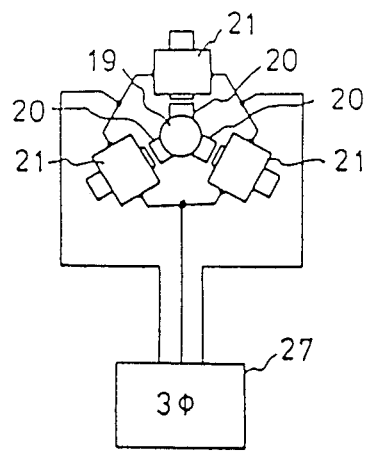
FIG. 4 is a schematic diagram representing a circuit for driving the dispersion feeder of FIGS. 1 and 2.

The electromagnets 21 are coupled to a three-phase a.c. power supply 27 as shown in FIG. 4. When the three electromagnets 21 are driven by respective phases of three-phase a.c. current, they are energized periodically with a 120 degree phase difference therebetween and thus sequentially attract the armatures 20 of the above resonance system to produce a revolving vibration in which the system, including vibrating member 12 and dispersion table 17, orbits the vertical axes 13 without substantial rotation of the system, such rotation being prevented by support rods 14 and leaf springs 22. During this orbital movement, every point on the surface of vibrating member 12 and conical dispersion table 17 traces generally circular path, with the centers of the vibrating member and dispersion table each tracing a circle centered on axis 13 and lying in a generally horizontal plane. This vibration is confined by the elastic support rods 14, and the amplitude of vibration (that is, the diameter of the circle traced by a point on the system) decreases toward the abovementioned intersection of the longitudinal axes of these rods 14. Although this variance will have little effect when the height of a vibrated body is very small, the amplitude of vibration will vary considerably in the vertical direction when the height of the vibrated body is large as in the case of sieve stack in a screening machine. It will be readily understood that this amplitude gradient is inverted upside-down when the support rods 14 are arranged diverging upwards, that no gradient appears when they are parallel, and that the amplitude gradient varies with the angle of inclination of the support rods 14. These factors may be selected to suit the use of the vibrator.

Figure 6:
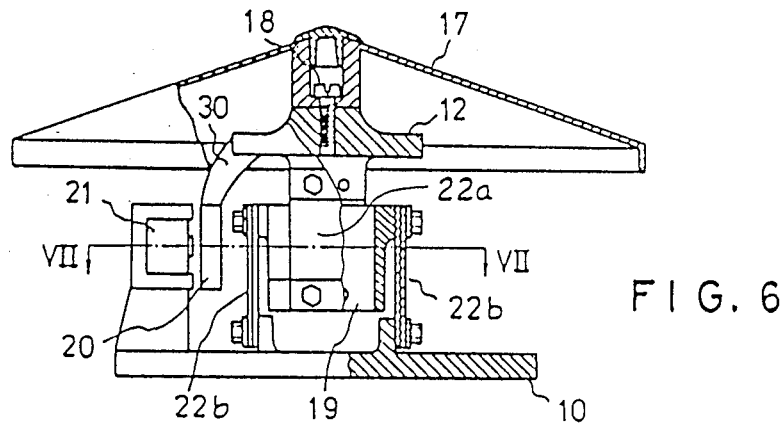
FIG. 6 is a partially sectional side view representing a dispersion feeder including another embodiment of this invention.
Figure 7:
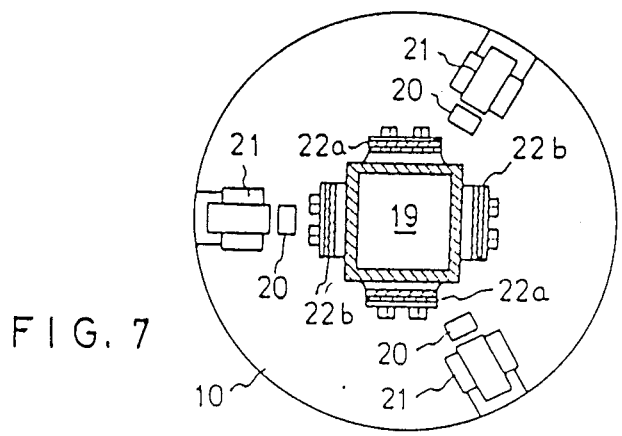
FIG. 7 is a sectional plan view taken along line VII—VII of FIG. 6.

Another embodiment shown in FIGS. 6 and 7 includes a vibrating member 12 supported above a stationary base 10 by first and second pairs of leaf springs 22a and 22b disposed in generally rectangular formation. The first pair of leaf springs 22a are mutually parallel and have their upper ends fixed to the vibrating member 12 and their lower ends fixed to a pair of opposing side walls of a tubular coupling member 19 having a square cross-section. The second pair of leaf springs 22b are also mutually parallel and have their upper ends fixed to the remaining pair of side walls of the coupling member 19 and their lower ends fixed to the stationary base 10. Three electromagnets 21 are fixed to the base 10, facing respective armatures 20. While this structure may be driven by the arrangement as shown in FIG. 4, the vibration contour of the dispersion table 17 assumes the shape of an inverted cone having an apex in the center of the leaf spring structure.

The amplitude of vibration can be adjusted easily by changing the current level which may be controlled by changing the supply voltage or changing the conduction timing in each cycle of a thyristor.

Figure 5:
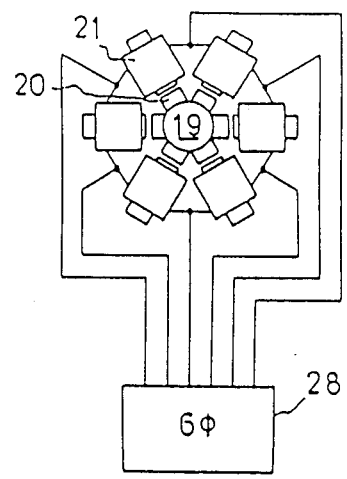
FIG. 5 is a schematic diagram representing an alternative driving circuit.

The number of armatures 20 need not be confined to three. FIG. 5 shows another example including six armatures 20 disposed around the vertical leg 19 and six corresponding electromagnets 21 driven by a six-phase a.c. supply 28.

As will be understood from the above, with the vibrator of this invention, a uniform vibration amplitude is obtainable over the entire surface of the dispersion table 17, and the amplitude level can be controlled easily.

As suggested above, the vibrator of this invention is effectively applicable to a screening machine and the like in addition to product feeders. Moreover, it should be noted that the above description has been made only for the purpose of illustration and the invention is not be limited thereto. Various modifications and changes can be made within the scope of invention as defined by the appended claims.

What is claimed is:

1. A vibrator comprising a stationary base, a vibrating member, support means supporting said vibrating member above said base for orbital movement of the member about a generally vertical axis without substantial rotational movement of the member, said support means comprising a plurality of leaf springs disposed between said base and said vibrating member at substantially equal angular intervals around and facing said vertical axis to form a vibration system having a substantially fixed spring constant in all directions in the plane of vibration of said vibrating member, at least three armatures attached to said vibrating member and disposed around said axis, and electromagnets confronting respective armatures and actuable by a multi-phase a.c. power supply to induce periodic driving forces having phase differences therebetween thereby to cause said orbital movement of said vibrating member without said substantial rotational movement.

2. A vibrator as set forth in claim 1, wherein said vibrator further comprises at least three elastic support rods disposed around said vertical axis for elastically supporting said vibrating member above said stationary base, each rod having an upper end fixed to said vibrating member and a lower end fixed to said stationary base.

3. A vibrator as set forth in claim 2, characterized in that the longitudinal axes of said support rods intersect at a point on said vertical axis.

4. A vibrator as set forth in claim 1, wherein said leaf springs form first and second pairs of leaf springs disposed around said vertical axis in a generally rectangular formation wherein the springs of each pair are disposed substantially parallel to each other, the upper ends of said first pair are fixed to said vibrating member, the lower ends of said first pair are coupled to the upper ends of said second pair, and the lower ends of said second pair are fixed to said stationary base.

5. A vibrator as set forth in claim 1, 2, 3 or 4, wherein said vibrating member has a table-like upper surface.

6. A vibrator as set forth in claim 1, 2, 3 or 4, wherein said vibrating member is a dispersion table.

7. A vibrator as set forth in claim 1, 2, 3 or 4, wherein said vibrating member is provided with a sieve.

8. A vibrator as set forth in claim 1, 2, 3 or 4, wherein said vibrating member is a parts feeder.

* * * * *